July 9, 1957  A. P. DOUGLAS  2,798,771
BICYCLE COASTER BRAKE HUB CONSTRUCTION
Filed Oct. 19, 1953  3 Sheets-Sheet 1

*INVENTOR.*
ALVIN P. DOUGLAS
By Albert R. Golrick
*ATTORNEY*

INVENTOR.

ALVIN P. DOUGLAS

ATTORNEY

July 9, 1957 A. P. DOUGLAS 2,798,771
BICYCLE COASTER BRAKE HUB CONSTRUCTION
Filed Oct. 19, 1953 3 Sheets-Sheet 3

INVENTOR.
ALVIN P. DOUGLAS
BY Golrick & Golrick
ATTORNEYS

United States Patent Office 2,798,771
Patented July 9, 1957

2,798,771
BICYCLE COASTER BRAKE HUB CONSTRUCTION

Alvin P. Douglas, Cleveland Heights, Ohio, assignor to The Murray-Ohio Manufacturing Company, Cleveland, Ohio, a corporation of Ohio Application October 19, 1953, Serial No. 386,864

4 Claims. (Cl. 301—105)

This invention is concerned with improvements in bicycle coaster brake mechanisms and coaster brake hubs and the general purpose thereof is the provision of hub structure, which will permit an increasing of the radial bearing structures and the braking surfaces without increasing the production costs of the improved coaster brake.

In manufacturing coaster brake mechanisms for bicycles, it has been the accepted practice to produce the hub structure, including the spoke anchoring flanges from solid bar stock, thus entailing a great deal of metal turning or cutting to bore out the brake cavity and form the integral spoke flanges. A compelling consideration of this fact has resulted in coaster brake structures wherein the included radial bearings and the internal braking diameter of the hub were held to a minimum in design diameters.

One of the purposes of the present invention is to provide a hub structure of increased diameter for the purpose of increasing the size of the radial bearings and the available braking surface whereby a reserve of braking power will be inherent in the mechanism, while avoiding increasing of production costs due to metal cutting.

A more specific object of the present invention is to increase the axial stabilizing influence of the radial bearings of a bicycle coaster brake mechanism.

A further object is the provision of a hub construction for bicycle coaster brakes, which is adaptable to conventional coaster brake mechanisms, and to coaster brake mechanisms, when combined with three speed bicycle transmissions.

A still further object is the production of a four element coaster brake hub structure so formed, assembled and brazed together as to afford an economical polishing, plating and finishing of the product.

Other objects of the present invention will become apparent from the following description of the disclosed coaster brake structure and of the method of producing the same. The essential characteristics thereof are summarized in the claims.

My invention contemplates a novel arrangement of four pressed metal elements of predetermined construction whereby the four elements may be press-fitted together and brazed together into a unitary hub structure, which can be machine finished, heat treated and polished in an economical manner.

Figure 3:
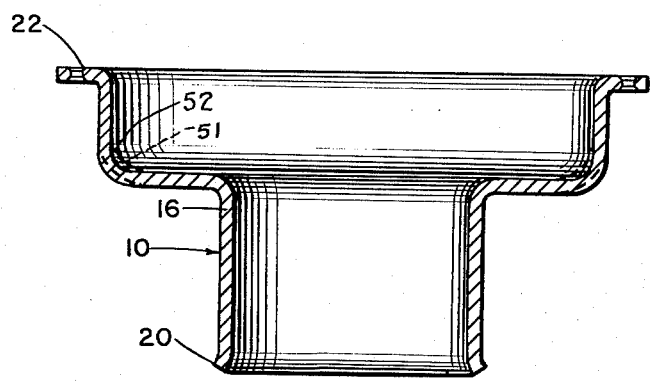
Figs. 3 and 4 show respectively the elements of Figs. 1 and 2 after certain punching operations have been effected thereon.
Figure 4:
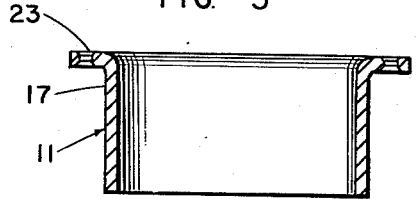
Figures 5, 7:
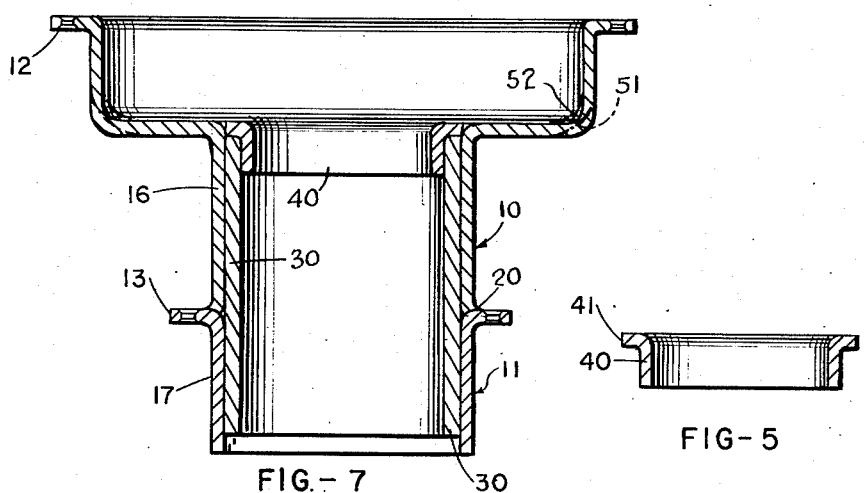
Fig. 5 shows a formed flanged member comprising eventually a clutch ring in the finished hub structure.
Fig. 7 shows a cross-section of the four elements in an assembled press-fitted and brazed unitary structure.

As hereinbefore stated, the formation of spoke anchoring flanges by metal cutting operations on bar stock is one of the costly production steps in the manufacture of coaster brake hubs for bicycles. In the proposed construction, these flanges are formed upon two separate pressed metal members. The cup members 10 and 11 as shown by reason of the flanges 12 and 13 can be deep drawn out of relatively heavy gauge sheet metal stock blanks by having the flange portions serve as a purchase for the press clamping ring as the blank is drawn, as shown, into cup shapes. The cylindrical portions 16 and 17 are of the same internal diameter and the axial length of the member 10 determines the distance between the spoke flanges as will be seen. The cup-shaped pieces then have the cup bottom sections sheared or punched out as shown in Figs. 3 and 4 and these two members will be referred to hereafter as the sprocket side member and the brake side member respectively. The shearing of the bottom of the sprocket side member is effected by a punching operation in such manner that the metal stock of the end of the sleeve will be bulged or formed outwardly as shown at 20 in Fig. 3 whereby the end will fit the shape of the flange 13 of the brake side member when the two members are telescoped upon an inner sleeve 30 as shown in Fig. 7. This end shape can be obtained, if desired, by machining the end contour.

Figure 1:
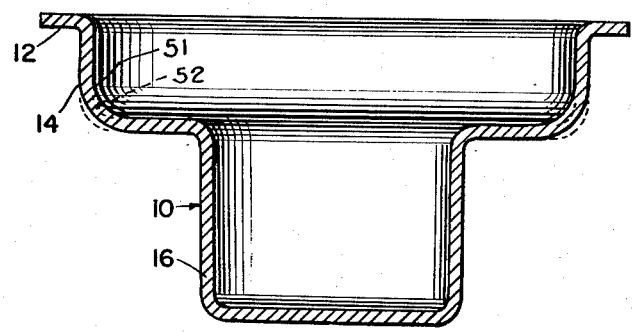
Fig. 1 is a cross-sectional view of one of the structural elements of my hub construction as drawn from relatively heavy gauge sheet metal in the first step of its manufacture.
Figure 2:
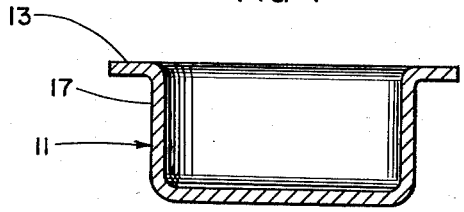
Fig. 2 is a cross-section of a second drawn element in an intermediate stage of manufacture.

The sprocket side member 10 has a diametrically enlarged sprocket side end 14 for the reception of a three speed planetary gear system and the inner annular corner of the resulting cavity is shaped eventually to constitute a ball track. Hence, this ball race is formed by drawing a broad radius, indicated in dash lines and by the reference numeral 51 in Fig. 1, and in a subsequent forming operation following a brazing operation, the metal is stretched to radius indicated at 52 in Fig. 3 to approximate the radius of the bearing ball to be used.

Referring to Figs. 3 and 4, the spoke receiving openings 22 and 23 may be formed in the flanges 12 and 13 of the respective members by piercing and coining operations to countersink the openings, or these spoke openings may be formed by gang drilling and countersinking as desired.

The inner sleeve 30 may be cut from tubing of the desired wall thickness and externally finished to a diameter relative to the drawn internal diameters of the sprocket side and brake side members 10 and 11 to afford a press-fit when these members are assembled upon the tube.

Figures 6, 6A:
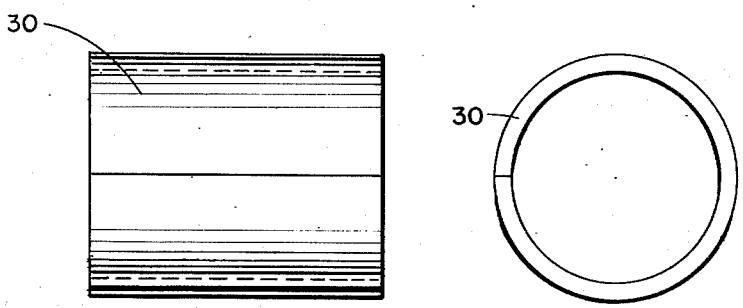
Fig. 6 shows a formed internal sleeve and comprising the fourth element of the hub structure.
Fig. 6A is a side view of the sleeve member shown in Fig. 6.

In Figs. 6 and 6A, the tube 30 is shown as being formed by curling a rectangular blank into a cylindrically closed tube shape. The length of the tube 30, as shown, is of less length than the combined lengths of the common cylindrical hub portions of the members 10 and 11. A drawn flanged clutch ring 40 having a flange 41 of slightly less diameter than the internal diameter of the sleeve 30 is press-fitted into the sprocket end of the sleeve 30 either at the time of fitting or after the members 10 and 11 have been fitted upon the sleeve 30 to produce the assembly of Fig. 7.

Figure 8:
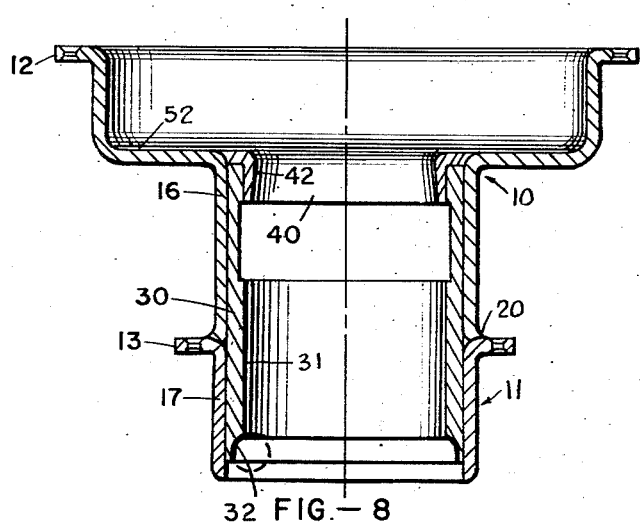
Fig. 8 is a cross-sectional view of the hub structure after the internal brake and cone clutch surfaces and the ball races have been formed by metal turning.

The press-fitted assembly of the pre-formed members 10, 11, 30 and 40 is then submitted to a copper brazing operation in a hyrdogen atmosphere, whereupon the fluid copper will flow by capillary attraction between the press-fitted surfaces of the respective members, including the abutting end 20 of the member 10 and the surface of the flange 13 of the member 11. The assembly thus becomes a unitary work piece of final external contour. To produce the final form of Fig. 8, this unitary work piece is then subjected to internal machining operations producing the braking surface 31, the bearing race or the bearing track 32 on the inner portion of the end of sleeve 30, and the cone shaped clutching surface 42. The aforementioned ball seat 52 may then be formed to final shape by stretching the radius in a press or by machining the radius 51. I contemplate die sizing the brazed assembly by the use of a split sizing die with the two halves of the die moving diametrically inwardly upon the cylindrical portions 16 and 17 and the cup shaped part of the hub structure while the work piece is supported by the die halves, the final ram pressure of the press axially exerted upon the work piece serving to true up the spoke flanges 12 and 13. If desired, the final forming of the ball races 52 may be effected in such an operation. This operation precedes the machining operations.

Figure 7A:
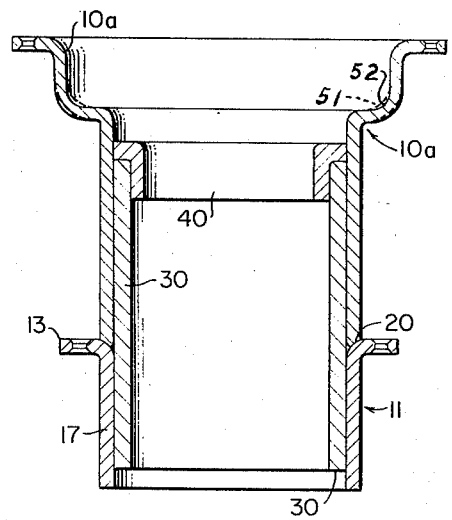
Fig. 7A shows the form of elements of a coaster brake hub construction, wherein no speed change mechanism is to be used, at a stage corresponding to Fig. 7.
Figure 8A:
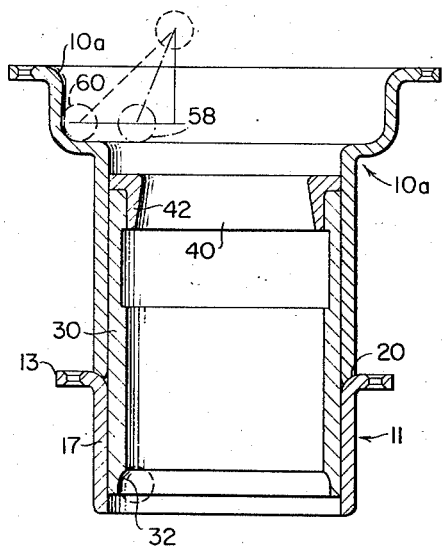
Fig. 8A shows the structure of Fig. 7A at a stage corresponding to Fig. 8.

When the outline method is followed to produce hubs for coaster brakes wherein no speed change mechanism is incorporated, a different set of dies is utilized to shape the flanged sprocket end member indicated 10a in Figs. 7A and 8A, while all the other procedures remain the same.

In Fig. 8A, I have shown the comparative shape of the sprocket end member and the increased radial bearing support available in a commercial form of coaster brake by the use of the present invention for bearings 60, indicated in dashed outline, in contrast with a conventionally located bearing 58, indicated in dot and dash outline. It will be noticed that the inner radial bearing 60 supporting the sprocket carrying clutch screw member can be disposed at a diameter which is considerably greater than the braking diameter of the coaster brake mechanism. In this manner, I attain a greater bearing stability for the rear bicycle-wheel. Any increased cost due to the use of larger radial bearings is offset by the savings in the cost of manufacturing the hub structure.

Since the invention contemplates a larger hub diameter in the brake mechanism region and the radius of the bearing race at the sprocket end of the hub structure is not limited by the brake hub diameter as heretofore, the entire construction is flexible from a design viewpoint to meet the desires of the manufacturer.

I have found that sheet metal blanks as heavy as 13 gauge 10-20 or 10-30 steel may be used in forming the flanged cups to the desired depths, and that the internal sleeve 30 and clutch ring 40 may be formed out of 11 gauge 10-25 or 10-30 steel. It is understood that mill bright sheet steel is used, and that the amount of polishing before plating is considerably reduced, since the disclosed shapes can be obtained without resulting deeply formed die marks and scratches. Also, the manner of abutting the sheared end of the member 10 upon the flanged end of the member 11 produces a smooth joint not at all detrimental to the plated appearance of the hub structure.

To those skilled in the art, it will be apparent that the assembly of the four members comprising the hub work piece may be secured together by welding and spot welding, although the copper brazing method is preferable, since the work piece is cleaner for subsequent machining and polishing. Also, it will be noted that the length of the brake side element 11 is such that the spoke flange is located approximately in an axial position midway of the braking surface 31 of the inner sleeve thereby adding substantially to the hub strength where the braking forces are exerted.

Any desired increase in the diameter of the sprocket side bearing can be attained over the diameter of the customarily arranged bearing (indicated in Fig. 8A by the dot and dash lines and reference numeral 58) by the disclosed stepped cup formation, which is axially located at the sprocket driving side of the hub structure in overhanging relation to the clutching and braking mechanism. In other words, the clutch and brake portions of the hub always remain the same, but the sprocket bearing end can have a desired diameter by simply increasing the diameter of the bearing portion of the element 10 or 10A. Hence, the invention can be followed to produce both standard type coaster brake hubs of increased diameter as well as coaster brake hubs wherein all or part of a three speed transmission is incorporated, while avoiding the expensive procedure of metal cutting large bar stock. A further advantage of the present invention is that relatively large diameter spoke flanges can be obtained without extensive metal cutting and these increased flanges decrease the required spoke lengths thus affording a sturdier rear wheel assembly than that heretofore obtained in standard practice.

I claim:

1. A bicycle coaster brake hub construction comprising a brake sleeve having an internal braking surface and two end flanged members having cylindrical portions of the same internal diameter secured to the sleeve, one of the members having an enlarged cup shape at one end and the two members being mounted on the brake sleeve with the flanged end of one member in abutting relation to the unflanged end of the cup shaped member, said sleeve having a bearing race formed at the end thereof remote from the cup structure and said cup structure having a bearing race formed therein of greater diameter than the sleeve bearing race.

2. A bicycle coaster brake hub construction comprising two end flanged cylindrical members and a brake and bearing sleeve with an inner end portion of the sleeve consisting of a bearing race, one of the flanged members being secured on the sleeve with the end flange thereof disposed axially inwardly of said sleeve bearing race substantially midway of the braking area of the sleeve, a clutch cone secured to the opposite end of the sleeve and said other flanged member being secured to the sleeve and having a diametrically enlarged cup shaped portion from which the flange extends radially with the enlarged portion and the flange thereof disposed outwardly from the clutch end of the sleeve and having a bearing race formed therein axially located intermediate the flange thereof and the cone clutch structure.

3. A bicycle coaster brake hub construction comprising two end flanged cylindrical members and a brake and bearing sleeve with an end portion of the sleeve consisting of a bearing race, one of the flanged members being secured on the sleeve with the flange thereof disposed inwardly of said sleeve bearing race and located substantially midway of the brake area of the sleeve and said other flanged member having a bearing cavity of greater diameter than the diameter of the other flanged member and being secured upon the sleeve with the cavity and flange thereof disposed outwardly from the clutch end of the sleeve.

4. An integrated coaster brake hub construction comprising two cylindrical members each having a radial flange formed at one end thereof, the flange of one member being of greater diameter than the flange of the other, an inner sleeve member upon which the flanged members are mounted with the non-flanged end of one member terminating adjacent and in abutting relation to the flanged end of the other member, said inner sleeve comprising the braking element of the hub structure and the flanged end of the last said member being disposed intermediate the braking region of said inner sleeve, and the flanged end of the other member projecting beyond and overhanging an end of the inner sleeve with the overhanging portion forming a bearing of greater diameter than the diameter of the sleeve.

References Cited in the file of this patent

UNITED STATES PATENTS

| | | |
|---|---|---|
| 1,173,793 | George | Feb. 29, 1916 |
| 2,016,923 | Herrmann | Oct. 8, 1935 |
| 2,419,862 | Wales | Apr. 29, 1947 |
| 2,497,242 | Sprouse | Feb. 14, 1950 |
| 2,609,596 | Clark | Sept. 9, 1952 |

FOREIGN PATENTS

| | | |
|---|---|---|
| 127,047 | Austria | Aug. 5, 1930 |
| 639,983 | France | Mar. 19, 1928 |